US012030336B2

(12) United States Patent
Wang

(10) Patent No.: US 12,030,336 B2
(45) Date of Patent: Jul. 9, 2024

(54) PRESSING TYPE WRITING INSTRUMENT

(71) Applicant: QINGDAO BEST POINT STATIONERY CO., LTD., Qingdao (CN)

(72) Inventor: Yuanhong Wang, Hangzhou (CN)

(73) Assignee: QINGDAO BEST POINT STATIONERY CO., LTD., Qingdao (CN)

(*) Notice: Subject to any disclaimer, the term of this patent is extended or adjusted under 35 U.S.C. 154(b) by 0 days.

(21) Appl. No.: 18/035,381

(22) PCT Filed: Jun. 7, 2021

(86) PCT No.: PCT/CN2021/098581
§ 371 (c)(1),
(2) Date: May 4, 2023

(87) PCT Pub. No.: WO2022/095444
PCT Pub. Date: May 12, 2022

(65) Prior Publication Data

US 2023/0406030 A1 Dec. 21, 2023

(30) Foreign Application Priority Data

Nov. 4, 2020 (CN) ......................... 202011217099.2

(51) Int. Cl.
*B43K 24/08* (2006.01)
*B43K 23/12* (2006.01)
*B43K 24/04* (2006.01)

(52) U.S. Cl.
CPC .............. *B43K 24/08* (2013.01); *B43K 23/12* (2013.01); *B43K 24/04* (2013.01)

(58) Field of Classification Search
CPC ........ B43K 24/08; B43K 23/12; B43K 24/00; B43K 24/02; B43K 24/026; B43K 24/04; B43K 24/10; B43K 24/12; B43K 24/16
(Continued)

(56) References Cited

U.S. PATENT DOCUMENTS 2,428,854 A * 10/1947 Randolph .............. B43K 24/08 401/113
2,930,355 A * 3/1960 Bollerup ................ B43K 24/08 401/113
3,144,005 A 8/1964 Johmann

FOREIGN PATENT DOCUMENTS

CN 102941757 2/2013
CN 105599494 5/2016
(Continued)

*Primary Examiner* — David J Walczak
(74) *Attorney, Agent, or Firm* — Jiwen Chen; Joywin IP Law PLLC

(57) ABSTRACT

Pressing type writing stationery including: a pen barrel (1), a pen refill (2) and a pressing positioning assembly (3). The pen refill (2) is configured with a pen point (21). The pressing positioning assembly (3) comprises a guide piece (31), a sliding piece (32) and a positioning piece (33), a guide sliding groove (311) is provided on the guide piece (31), and a rotary driving part (312) and a positioning cooperation part (313) are provided in the guide sliding groove (311); the sliding piece (32) is slidably mounted on the guide piece (31) in the length direction of the guide sliding groove (311); the positioning piece (33) is rotatably mounted on the sliding piece (32), and a positioning part (331) is provided on the positioning piece (33); the positioning part (331) is slidably provided in the guide sliding groove (311); and the guide piece (31) is provided in the pen barrel (1), and the sliding piece (32) is connected to the pen refill (2).

9 Claims, 8 Drawing Sheets

(58) Field of Classification Search
USPC ...................................... 401/29–33, 109–112
See application file for complete search history.

(56) References Cited

FOREIGN PATENT DOCUMENTS

| | | |
|---|---|---|
| CN | 105691045 | 6/2016 |
| CN | 205468078 | 8/2016 |
| CN | 107379825 | 11/2017 |
| CN | 110217018 | 9/2019 |

* cited by examiner

PRESSING TYPE WRITING INSTRUMENT

This is a U.S. national stage application of PCT Application No. PCT/CN2021/098581 under 35 U.S.C. 371, filed Jun. 7, 2021 in Chinese, claiming priority of Chinese Application No. 202011217099.2, filed Nov. 4, 2020, all of which are hereby incorporated by reference.

TECHNICAL FIELD

The present invention relates to a writing instrument, in particular to a pressing type writing instrument.

BACKGROUND TECHNOLOGY

Writing pens (signature pens, oil-based pens, gel pens, etc.) are indispensable stationery items in people's daily life and work. Writing pens are divided into a pressing type and a cap type depending on how they are used, and the pressing type is very popular because of it is easy to use. A typical pressing type pen has a cogged structure to push out and position a pen tip. For example, the Chinese patent application No. 2018103199956 discloses a writing instrument capable of ejecting the pen tip in a reverse direction after being pressed, in which a push rod with rotating teeth and a locking rod with gears are provided to position the pen tip. However, since the gear still needs to cooperate with positioning ribs on the inner wall of the pen barrel as it rotates when the writing instrument is used, the locking rod at the bottom may get stuck on the positioning ribs and cannot back to its position due to assembly errors, resulting in a dead state of the writing instrument and poor user experience.

In view of the foregoing, the technical problem to be solved by the present invention is how to design a writing instrument that can be pressed smoothly in order to improve ease of use.

SUMMARY OF THE INVENTION

One aspect of the present invention is to provide a pressing-type writing instrument, which improves the smoothness for pressing the pressing-type writing instrument and improve user experience.

A pressing type writing instrument, wherein it comprises:

a pen holder, a refill provided with a pen tip, which is disposed inside the pen holder;

a pressing and positioning assembly comprising a guide member, a sliding member and a positioning member, wherein a guide chute provided with a rotating driving part and a positioning matching part thereon is formed on the guide member; the sliding member is mounted on the guide member and is capable of sliding along the direction of the length of the guide chute, the positioning member is rotatably mounted on the sliding member; a positioning portion is formed on the positioning member, which is slidably disposed within the guide chute; the guide member is disposed within the pen holder and sliding member is connected to the refill; and a spring disposed within the pen holder and used to reset the refill or the sliding member; and a pen cap provided on the sliding member;

in which, during the process of the sliding member causing the positioning member to move toward the rotating driving part, the rotating driving part is used to be in contact with the positioning portion to allow the positioning member to rotate and the positioning matching part is used to cooperate with the positioning portion to limit the pen tip of the refill to protrude to the outside of the pen holder.

Further, the positioning portion is provided with two groove structures arranged back to back.

Further, the positioning matching part is used to be stuck in the corresponding groove structure to limit the pen tip of the refill to protrude to the outside of the pen holder.

Further, the guide chute comprises a first groove portion and a second groove portion, and the width of the second groove portion is larger than the width of the first groove portion, the rotating driving part and the positioning matching part are disposed in the second groove portion, the positioning portion is capable of rotating in the second groove portion.

Further, the rotating driving part is disposed on one side of the central movement track of the positioning member and the positioning matching part is located on the other side of the central movement track of the positioning member.

Further, the side portion of the guide member is provided with a first guiding protrusion and the side portion of the sliding member is provided with a first sliding groove and the first guiding protrusion is located in the first sliding groove.

Further, a side portion of the guide member is further provided with a first guide protrusion, a side portion of the sliding member is provided with a first chute, and the first guide protrusion is located in the first chute.

Further, the side portion of the guide member is provided with a second sliding groove and the side portion of the sliding member is provided with a second guiding protrusion and the second guiding protrusion is located in the second sliding groove.

Further, the positioning member is provided with a rotating shaft, the sliding member is provided with a shaft hole, and the rotating shaft is rotatably arranged in the shaft hole.

Further, the sliding member is provided with a circular groove, the positioning member is a disk structure, the positioning portion is located on one surface of the positioning member, and the rotating shaft is located on the other surface of the positioning member, and the positioning member is rotatably arranged in the circular groove.

Further, it also includes: a pen cap, the pen cap is arranged on the sliding member and is located outside the pen holder.

The advantages and positive effects of the present invention as compared with the prior art are as follows: the present invention provides a pressing type writing instrument, in which a pressing and positioning assembly is provided within the pen holder. The sliding member of the pressing and positioning assembly could drive the refill to extend out; and in the process of pressing, the cooperation of the rotating positioning member and the guide member is used to limit the sliding member, thereby allowing the pen tip of the refill to protrude to the outside of the pen holder; in the process of using, the pressing and positioning assembly relies on its own structure to limit the refill, there is no need to cooperate with the pen holder in structure, thereby reducing the occurrence that the refill cannot be retracted and improving the writing smoothness and the user experience.

BRIEF DESCRIPTION OF DRAWINGS

In order to more clearly illustrate the embodiments of the present invention or the technical solutions in the prior art, the following briefly introduces the accompanying drawings that need to be used in the description of the embodiments or the prior art are briefly introduced below. Obviously, the accompanying drawings in the following description are some embodiments of the present invention, and those skilled in the art will be able to derive other drawings from these drawings without any creative effort.

DETAILED DESCRIPTION OF THE INVENTION

Figure 1:
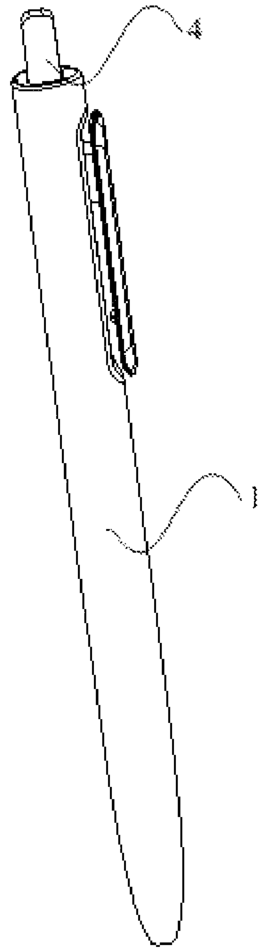
FIG. 1 is a schematic structural diagram of a pressing type writing instrument according to an embodiment of the present invention.
Figure 2:
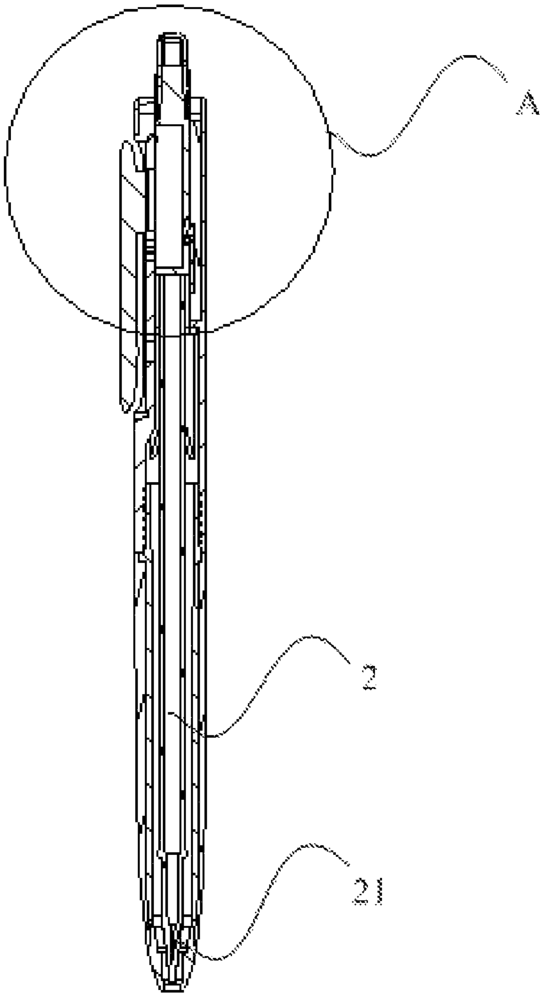
FIG. 2 is a sectional view of the pressing type writing instrument shown in FIG. 1.
Figure 3:
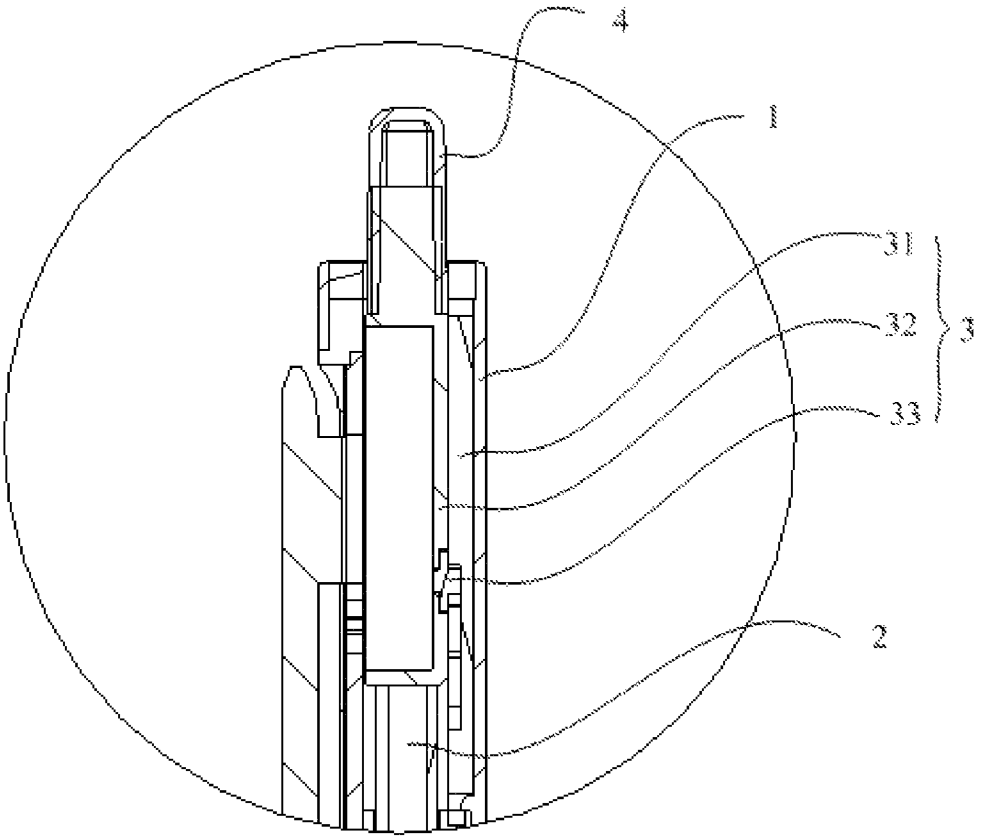
FIG. 3 is the partial enlarged schematic diagram of the area A shown in FIG. 2.
Figure 4:
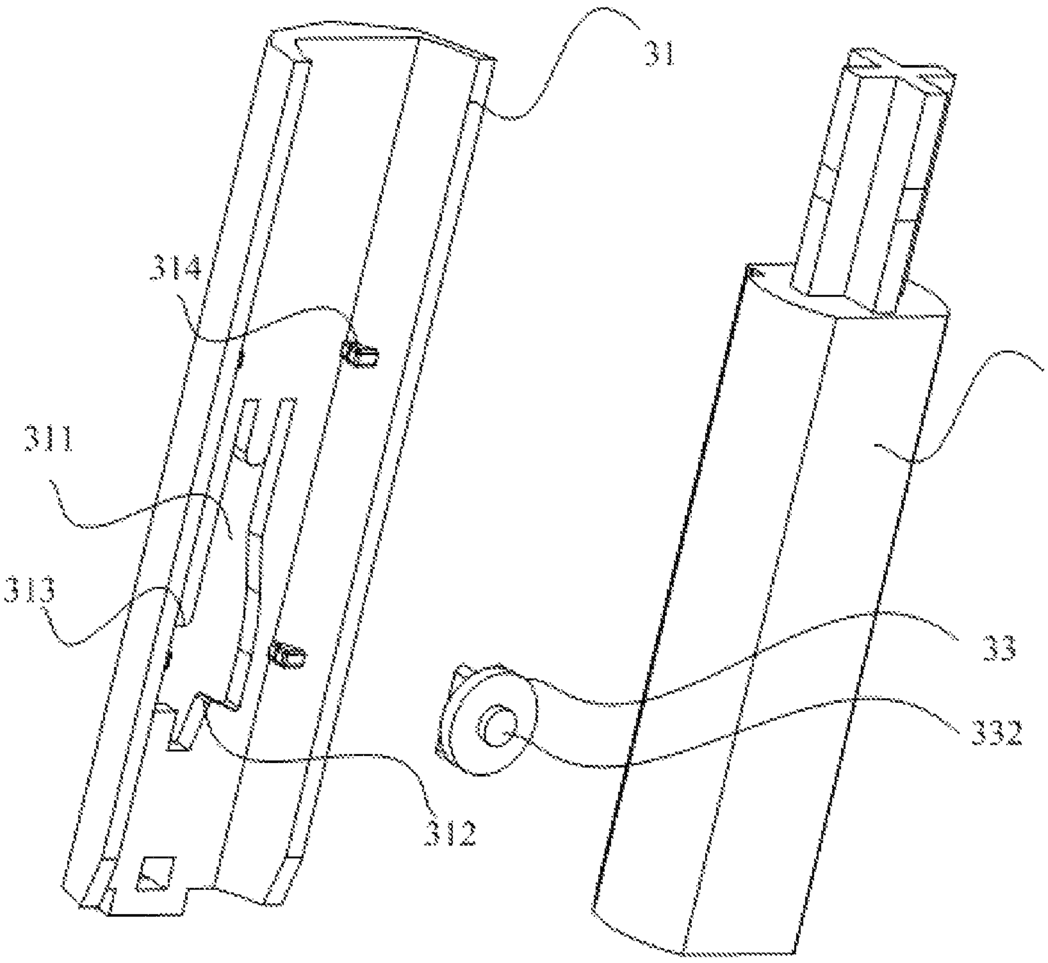
FIG. 4 is one of the exploded views of a pressing and positioning assembly in a pressing type writing instrument according to an embodiment of the present invention.
Figure 5:
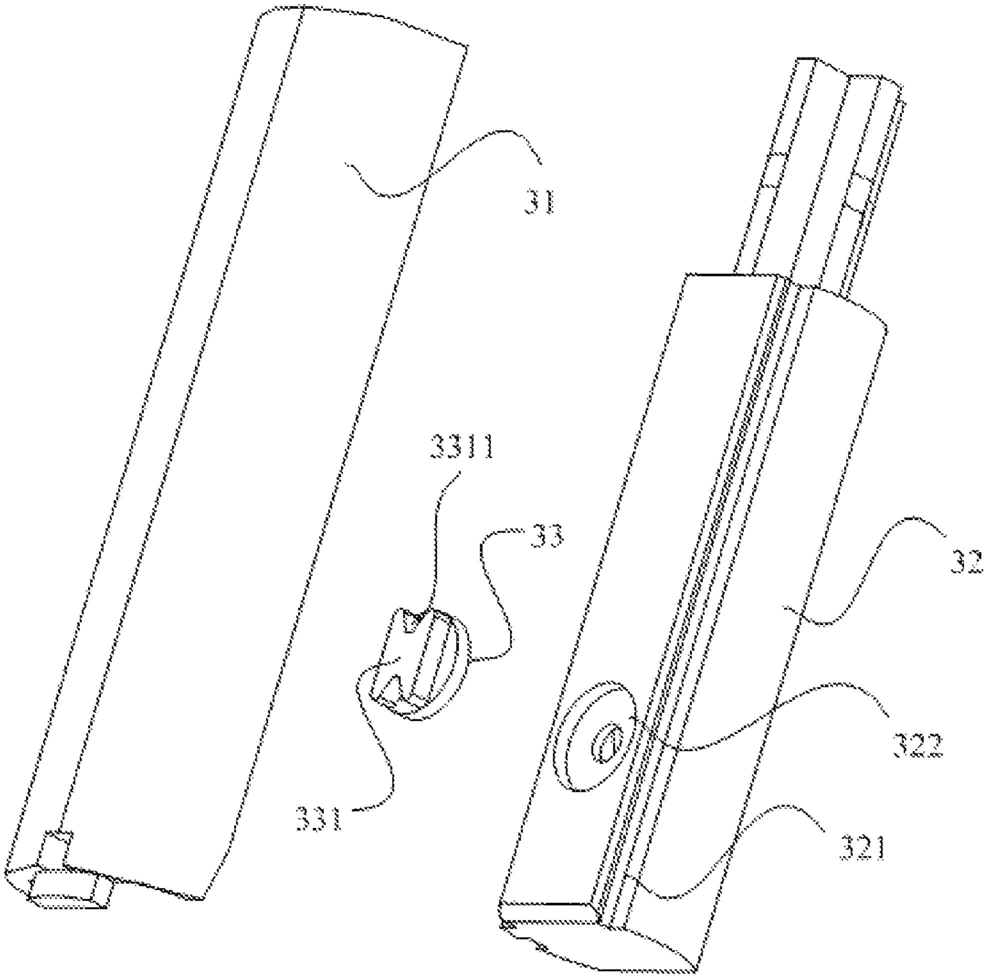
FIG. 5 is one of the exploded views of a pressing and positioning assembly in a pressing type writing instrument according to an embodiment of the present invention.

In order to make clearer the purposes, technical solutions and advantages of the embodiments of the present invention clearer, the technical solutions disclosed in the embodiments of the present invention will be clearly and completely described below with reference to the accompanying drawings. Obviously, the embodiments described are only a part of the embodiments of the present invention, but not all embodiments. Based on the embodiments of the present invention, all other embodiments, which can be obtained by those skilled in the art without creative effort, are to be considered within the scope of protection of the present invention.

As shown in FIG. 1 to FIG. 8, a pressing type writing instrument disclosed in the present embodiment comprises:

- a pen holder 1;
- a refill 2 provided with a pen tip 21, which is disposed inside the pen holder 1;
- a pressing and positioning assembly 3 comprising a guide member 31, a sliding member 32 and a positioning member 33, wherein a guide chute 311 provided with a rotating driving part 312 and a positioning matching part 313 thereon is formed on the guide member 31, the sliding member 32 is mounted on the guide member 31 and is capable of sliding along the direction of the length of the guide chute 311, the positioning member 33 is rotatably mounted on the sliding member 32; a positioning portion 331 is formed on the positioning member 33, which is slidably disposed within the guide chute 311; the guide member 31 is disposed within the pen holder 1 and the sliding member 32 is connected to the refill 2; and
- a spring (not shown in the figures) disposed within the pen holder 1 and used to reset the refill 2 or the sliding member 32;
- wherein, during the process of the sliding member 32 causing the positioning member 33 to move toward the rotating driving part 312, the rotating driving part 312 is used to be in contact with the positioning portion 331 to allow the positioning member 33 to rotate and the positioning matching part 313 is used to cooperate with the positioning portion 331 to limit the pen tip 21 of the refill 2 to protrude to the outside of the pen holder 1.

In particular, the independent pressing and positioning assembly 3 is provided in the pen holder 1 for positioning the protruding pen tip 21; wherein, when the sliding member 32 is moved by an external force, the positioning member 33 is driven to move together so that the positioning portion 331 slides in the guide chute 311; when the positioning portion 331 slides to the place where the rotating driving part 312 is located, the positioning portion 331 rotates in the guide chute 311 due to being abutted against the rotating driving part 312, and further, the contact cooperation between the positioning matching part 313 and the positioning portion 331 locates the position of the sliding member 32. The rotating driving part 312 is used to drive the positioning member 33 to rotate by being in contact with the positioning portion 331, and by snapping the positioning portion 331, the positioning matching part 313 is used to allow the pen tip 21 of the refill 2 to protrude to the outside of the pen holder 1 and further to be held in the protruded state, thereby satisfying users' writing requirements. For ease of use, the pressing type writing instrument is provided with an independent pen cap 4, and the pen cap 4 is provided on the sliding member 32.

Figure 6:
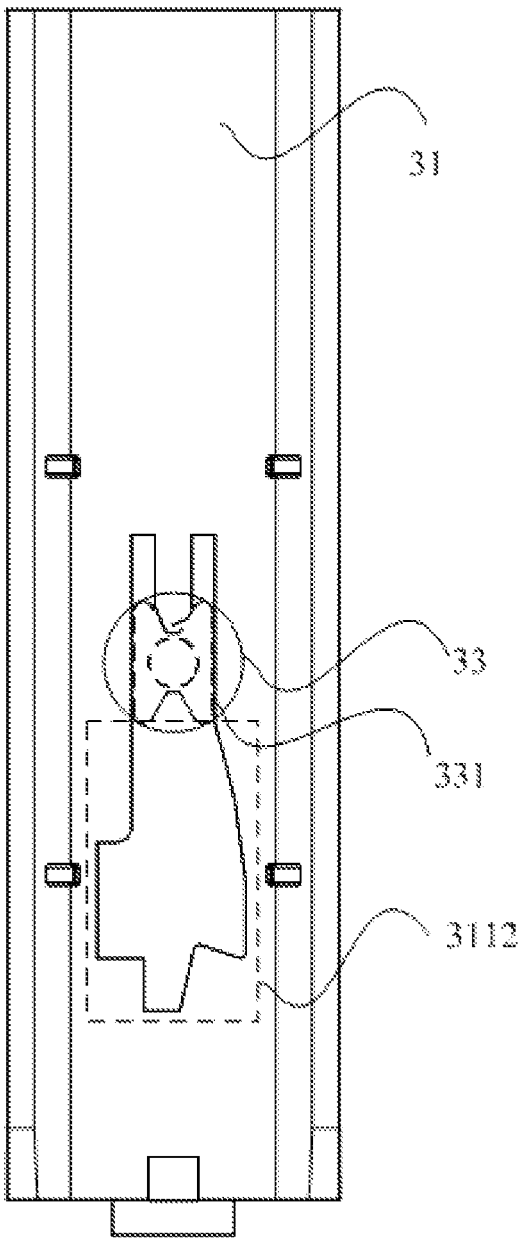
FIG. 6 is one of the partial structural schematic diagrams of a pressing and positioning assembly in a pressing type writing instrument according to an embodiment of the present invention.
Figure 7:
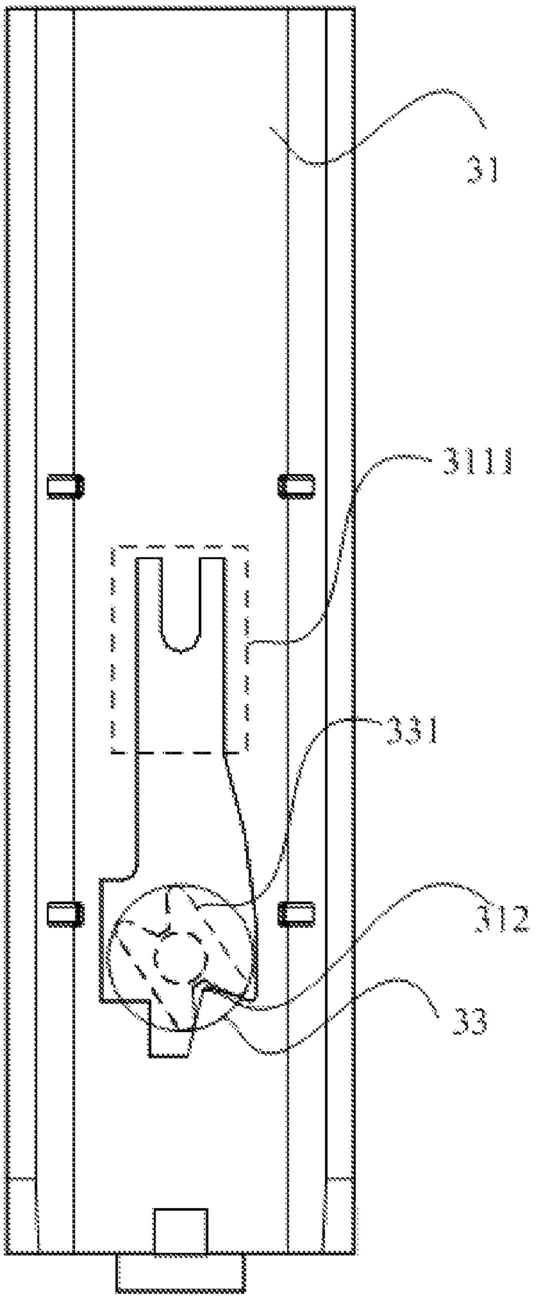
FIG. 7 is one of the partial structural schematic diagrams of a pressing and positioning assembly in a pressing type writing instrument according to an embodiment of the present invention.
Figure 8:
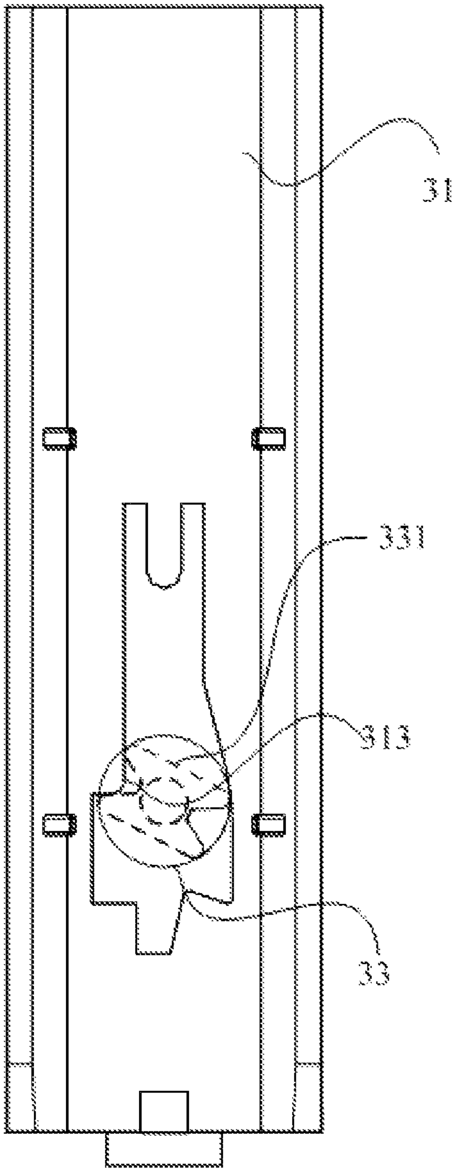
FIG. 8 is one of the partial structural schematic diagrams of a pressing and positioning assembly in a pressing type writing instrument according to an embodiment of the present invention.

With the reference to the specific use process, when the user uses the pressing type writing instrument for writing, the pen cap 4 is pressed by a finger. As shown in FIG. 6, the pen cap drives the sliding member 32 to move toward the pen tip 21 and to allow the positioning portion 331 to move toward the rotating driving part 312. As shown in FIG. 7, during the process of the sliding member 32 moving, the positioning portion 331 is in contact with the rotating driving part 312. The rotating driving part 312 causes the positioning portion 331 to rotate so that the positioning portion 331 can rotate toward the positioning matching part 313. As shown in FIG. 8, when the user releases his hand, under the action of the spring, the sliding member 32 moves in the opposite direction to drive the positioning portion 331 to slide in the opposite direction in the guide chute 311, the positioning portion 331 is limited by the positioning matching part 313 and engaged with each other; at this time, the pen tip 21 of the refill 2 is held in the protruded state outside the pen holder 1 for ease of use.

When the user presses the pen cap again, the positioning portion 331 again moves towards the rotating driving part 312 in the guide chute 311. At this time, the positioning portion 331 and the rotating driving part 312 are separated. When the rotating driving part 312 is in contact with the positioning portion 331, the rotating driving part 312 drives the positioning portion 331 to rotate again. When the user releases his hand, the sliding member 32 moves in the opposite direction under the action of the spring, the positioning portion 331 moves away from the rotating driving part 312 and the positioning matching part 313 along the guide chute 311 until moves to the end of the guide chute 311. At this time, the pen tip 21 of the refill 2 retracts into the pen holder 1.

By using the pressing and positioning assembly 3 to position the pen tip 2, during the entire positioning process, only the pressing and positioning assembly 3 is used for positioning the refill 2, there is no need to cooperate with other internal positioning ribs in the pen holder 1. In assembly, the assembler is only required to insert the pressing and positioning assembly 3 into the pen holder 1, while the pressing and positioning assembly 3 could be preassembled outside the pen holder 1 for carrying out a quick and convenient assembly; relying on the arrangement that the positioning portion 331 cooperates with the rotating driving part 312 and the positioning matching part 313, the positioning portion 331 could be more reliably limited by the positioning matching part 313 to ensure a normal use by the user.

More importantly, since there is no need to use gears for positioning, there is no gear jumping, impact or collision when gears are matched and positioned will occur, which greatly reduces the noise generated during pressing, so that silent pressing is achieved. At the same time, since no impact and collision between components occurs in the pressing and positioning assembly 3 during use, the vibration and impact on the ink in the refill 2 is reduced, thereby reducing the occurrence of ink leakage from the refill 2 due to impact.

In addition, the conventional position for mounting a spring in a press type pen could be used, such as to mount the spring between the pen holder 1 and the refill 2, and the refill 2 and the sliding member 32 are connected by contact. In the case where the spring exerts an elastic return force on the sliding member 32, the spring is sheathed outside the refill 2 and is sandwiched between the pen holder 1 and the sliding member 32. At the same time, the refill 2 and the sliding member 32 may have a screw connection or a snap connection, which will not be limited or described in detail here. As for the assembly of the guide member 31 and the pen holder 1, the guide member 31 may be detachably installed on the pen holder 1 by clamping or the like, which is not limited or described herein.

Furthermore, the positioning portion 331 is provided with two groove structures 3311 arranged back to back. In particular, each time the user presses the pen cap twice, the positioning member 33 rotates 180 degrees. The arrangement in which the two ends of the positioning member 33 are each provided with the groove structures 3311 could satisfy the requirement for the positioning portion 331 to cooperate with the positioning match part 313 for positioning. When the pen tip 21 of the refill 2 protrudes from the pen holder 1 in use, the positioning match part 313 is stuck in the corresponding groove structure 3311 to limit the pen tip 21 of the refill 2 protruding outside the pen holder 1.

The rotating driving part 312 and the positioning matching part 313 could be protruding blocks arranged in the guide chute 311. When the positioning part 331 slides, the protruding blocks at different positions could drive the positioning portion 331 to rotate, to cooperate or snap for positioning.

In addition, the specific process when the positioning portion 331 slides are described as follows.

During the process of the sliding member 32 moving towards the rotating driving part 312, the rotating driving part 312 abuts against one of the groove structures 3311 to drive the positioning member 33 to rotate; and when the sliding member 32 moves in the opposite direction away from the rotating driving part 312, the positioning matching part 313 is stuck in the other groove structure 3311. In particular, when the user needs to write, the user presses the pen cap once so that the rotating driving part 312 cooperates with one of the groove structures 3311 to rotate the positioning portion 331, so that the other groove structure 3311 is aligned with the positioning matching part 313; when the user releases the hand, the cooperation of the positioning matching part 313 and the groove structure 3311 could realize a snap connection for locking and positioning, further to allow the pen tip 21 to protrude out of the pen holder 1.

During the process of the sliding member 32 moving towards the rotating driving part 312 again, the rotating driving part 312 abuts against one of the side portions of the positioning portion 331 to drive the positioning member 33 to rotate and the positioning matching part 313 is detached from the other groove structure 3311; when the sliding member 32 moves in the opposite direction away from the rotating driving part 312 again, the positioning matching part 313 abuts against the other side portion of the positioning portion 331 to drive the positioning member 33 to rotate until the positioning member 33 slides along the side walls of the guide chute 311. In particular, when the pen tip 21 is to be retracted into the pen holder 1, the user presses the pen cap again, at which time the positioning matching part 313 is detached from the corresponding groove structure 3311 for contact positioning. Meanwhile, one side portion of the positioning portion 331 is in contact with the rotating driving part 312 to drive the positioning portion 331 to rotate so as to allow the groove structure to be located on one side of the positioning match part 313; when the user releases the hand, when the positioning portion 331 moves in the opposite direction, the other side portion of the positioning portion 331 is in contact with the positioning matching part 313 to allow the positioning portion 331 to rotate further so as to allow the positioning portion 331 to rotate 180 degrees and move along the guide chute 311 to be reset.

Furthermore, in order to provide reliable guidance for the positioning portion 331 and to satisfy the requirement that the positioning portion 331 rotates in the guide chute 311, the guide chute 311 comprises a first groove portion 3111 and a second groove portion 3112, and the width of the second groove portion 3112 is larger than the width of the first groove portion 3111, the rotating driving part 312 and the positioning matching part 313 are disposed in the second groove portion 3112, the positioning portion 331 is able to rotate in the second groove portion 3112. In particular, the width of the first groove portion 3111 is slightly larger than the width of the positioning portion 331 to allow the positioning portion 331 to slide smoothly in the first groove portion 3111 and to receive reliable guidance. The width of the second groove portion 3112 gradually increases, so that after the positioning portion 331 slides from the first groove portion 3111 to the second groove portion 3112, the positioning portion 331 could be in contact with the rotating driving part 312 and then be able to rotate in the second groove portion 3112.

In addition, in order to enable the rotation driving part 312 to reliably drive the positioning portion 331 to rotate, the rotating driving part 312 is disposed on one side of the central movement track of the positioning member 33 and the positioning matching part 313 is located on the other side of the central movement track of the positioning member 33. In particular, during the process of the positioning member 33 moving, the center of the positioning member 33 reciprocates along a straight line, namely the central movement track, and the rotating driving part 312 is located on one side of the central movement track to allow the rotating driving part 312 to be located on one side of the central portion of the groove structure 3311 and to be inserted into the groove structure 3311, so that the positioning portion 331 can rotate.

Therefore, the rotating driving part 312 is disposed on one side of the guide chute 311 and the positioning matching part 313 is disposed on the other side of the guide chute 311, the rotating driving part 312 and the positioning matching part 313 are disposed obliquely opposite to each other. In particular, the rotating driving part 312 is arranged on one side of the second groove portion 3112 and away from the first groove portion 3111 and the positioning matching part 313 is arranged on the other side of the second groove portion 3112 and close to the first groove portion 3111.

Furthermore, in order to ensure the smooth sliding of the sliding member 32 on the guide member 31, the side portion of the guide member 31 is further provided with a first guiding protrusion 314 and the side portion of the sliding member 32 is provided with a first sliding groove 321 and the first guiding protrusion 314 is located in the first sliding groove 321. In particular, when the sliding member 32 slides, the first guiding protrusion 314 cooperates with the first sliding groove 321 to guide the sliding member 32 to slide smoothly; wherein a plurality of the first guiding protrusions 314 may be arranged on both sides of the guide member 31 and a plurality of the first sliding grooves 321 may be arranged on both sides of the sliding member 32 respectively. Similarly, a second sliding groove is arranged on both sides of the guide member 31 and a second guiding protrusion is arranged on both sides of the sliding member 32 and the second guiding protrusion is located in the second sliding groove.

Furthermore, in order to conveniently assemble the positioning member 33 and the sliding member 32 together, the positioning member 33 is provided with a rotating shaft 332, the sliding member 32 is provided with a shaft hole (not shown in the figures), and the rotating shaft 332 is rotatably arranged in the shaft hole. In particular, the rotating shaft 332 is arragned in the shaft hole to meet the requirement that the positioning member 33 is rotatably arranged on the sliding member 32. In order to meet the design requirements of a compact structure, the sliding member 32 is provided with a circular groove 322, the positioning member 33 is a disk structure, the positioning portion 331 is located on one surface of the positioning member 33, and the rotating shaft 332 is located on the other surface of the positioning member 33, and the positioning member 33 is rotatably arranged in the circular groove 322. In particular, the arrangement of the circular groove 322 on the sliding member 32 could allow the positioning member 33 to be disposed in the circular groove 322 and to extend from the circular groove 322 and into the guide chute 311, so that the sliding member 32 and the guide member 31 could be in closely abutted to each other so that the overall structure is more compact.

Finally, although the present invention has been described in detail with reference to the foregoing embodiments, those skilled in the art should understand that it is still possible for the technical solutions described in the foregoing embodiments to be modified, or for some technical features thereof to be equivalently substituted; and that these modifications or substitutions do not cause the essence of the corresponding technical solutions to deviate from the spirit and scope of the technical solutions of the embodiments of the present invention.

The invention claimed is:

1. A pressing type writing instrument, wherein it comprises:

a pen holder, a refill provided with a pen tip, which is disposed inside the pen holder;

a pressing and positioning assembly comprising a guide member, a sliding member and a positioning member, wherein a guide chute provided with a rotating driving part and a positioning matching part thereon is formed on the guide member; the sliding member is mounted on the guide member and is capable of sliding along a direction of a length of the guide chute, the positioning member is rotatably mounted on the sliding member; a positioning portion is formed on the positioning member, which is slidably disposed within the guide chute; the guide member is disposed within the pen holder and sliding member is connected to the refill; and a spring disposed within the pen holder and used to reset the refill or the sliding member; and a pen cap provided on the sliding member;

in which, during the process of the sliding member causing the positioning member to move toward the rotating driving part, the rotating driving part is used to be in contact with the positioning portion to allow the positioning member to rotate and the positioning matching part is used to cooperate with the positioning portion to limit the pen tip of the refill to protrude to the outside of the pen holder.

2. The pressing type writing instrument according to claim 1, wherein the positioning portion is provided with two groove structures arranged back to back.

3. The pressing type writing instrument according to claim 2, wherein the positioning matching part is used to be stuck in the corresponding groove structure to limit the pen tip of the refill to protrude to the outside of the pen holder.

4. The pressing type writing instrument according to claim 1, wherein the guide chute comprises a first groove portion and a second groove portion, and a width of the second groove portion is larger than a width of the first groove portion, the rotating driving part and the positioning matching part are disposed in the second groove portion, the positioning portion is capable of rotating in the second groove portion.

5. The pressing type writing instrument according to claim 1, wherein the rotating driving part is disposed on one side of a central movement track of the positioning member and the positioning matching part is located on the other side of the central movement track of the positioning member.

6. The pressing type writing instrument according to claim 1, wherein a side portion of the guide member is provided with a first guiding protrusion and a side portion of the sliding member is provided with a first sliding groove and the first guiding protrusion is located in the first sliding groove.

7. The pressing type writing instrument according to claim 1, wherein a side portion of the guide member is provided with a sliding groove and a side portion of the sliding member is provided with a guiding protrusion and the guiding protrusion is located in the sliding groove.

8. The pressing type writing instrument according to claim 1, wherein the positioning member is provided with a rotating shaft, the sliding member is provided with a shaft hole, and the rotating shaft is rotatably arranged in the shaft hole.

9. The pressing type writing instrument according to claim 1, wherein the sliding member is provided with a circular groove, the positioning member is a disk structure, the positioning portion is located on one surface of the positioning member, and the rotating shaft is located on the other surface of the positioning member, and the positioning member is rotatably arranged in the circular groove.

* * * * *